(12) United States Patent
Lee et al.

(10) Patent No.: US 12,494,370 B2
(45) Date of Patent: Dec. 9, 2025

(54) LASER MACHINING DEVICE AND METHOD THEREOF

(71) Applicant: INDUSTRIAL TECHNOLOGY RESEARCH INSTITUTE, Hsinchu (TW)

(72) Inventors: Yi-Chi Lee, Taichung (TW); Bo-Han Chen, Taichung (TW); Chih-Hsuan Lu, Pingtung County (TW); Ping-Han Wu, Tainan (TW); Zih-Yi Li, Tainan (TW); Shang-Yu Hsu, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 663 days.

(21) Appl. No.: 17/960,756

(22) Filed: Oct. 5, 2022

(65) Prior Publication Data
US 2024/0066635 A1 Feb. 29, 2024

(30) Foreign Application Priority Data
Aug. 31, 2022 (TW) .................. 111132857

(51) Int. Cl.
*H01L 21/268* (2006.01)
*B23K 26/0622* (2014.01)
(Continued)

(52) U.S. Cl.
CPC ........ *H01L 21/268* (2013.01); *B23K 26/0624* (2015.10); *H01S 3/005* (2013.01); *H10D 62/8325* (2025.01)

(58) Field of Classification Search
CPC .... H01S 3/005; H01L 21/268; B23K 26/0624
See application file for complete search history.

(56) References Cited

U.S. PATENT DOCUMENTS

| 6,291,796 B1 | 9/2001 | Lu et al. |
| 9,209,591 B2 | 12/2015 | Takeda et al. |

(Continued)

FOREIGN PATENT DOCUMENTS

| CN | 102207658 B | 2/2013 |
| CN | 103222133 A | 7/2013 |

(Continued)

OTHER PUBLICATIONS

Kim et al. "4H—SiC wafer slicing by using femtosecond laser double-pulses" Optical Materials Express vol. 7, Issue 7, pp. 2450-2460 (Jul. 2017).
(Continued)

*Primary Examiner* — Woody A Lee, Jr.
(74) *Attorney, Agent, or Firm* — Maschoff Brennan (57) ABSTRACT

A laser machining device includes a pulsed laser generator, an accommodation chamber, a bandwidth broadening unit and a pulse compression unit. The pulsed laser generator is configured to emit a pulsed laser. The accommodation chamber has a gas inlet. The bandwidth broadening unit is disposed in the accommodation chamber, and is configured to broaden a frequency bandwidth of the pulsed laser to obtain a broad bandwidth pulsed laser. The pulse compression unit is disposed in the accommodation chamber. The bandwidth broadening unit and the pulse compression unit are arranged in order along a laser propagation path, and the pulse compression unit is configured to compress a pulse duration of the broad bandwidth pulsed laser.

12 Claims, 7 Drawing Sheets

(51) Int. Cl.
*H01S 3/00* (2006.01)
*H10D 62/832* (2025.01)

(56) References Cited

U.S. PATENT DOCUMENTS

| | | | |
|---|---|---|---|
| 9,808,884 | B2 | 11/2017 | Hirata et al. |
| 2006/0119855 | A1* | 6/2006 | Li .................... G01J 11/00 356/450 |
| 2011/0220625 | A1* | 9/2011 | Pluss ............... B23K 26/0823 219/121.72 |
| 2013/0235895 | A1 | 9/2013 | Mizuuchi et al. |
| 2014/0209576 | A1* | 7/2014 | Ozbaysal ............ C23C 24/106 219/137 R |
| 2014/0376084 | A1* | 12/2014 | Harter .................. H01S 3/0085 359/341.3 |
| 2020/0259305 | A1 | 8/2020 | Piccoli et al. |
| 2022/0035172 | A1 | 2/2022 | Yang et al. |

FOREIGN PATENT DOCUMENTS

| | | |
|---|---|---|
| CN | 111934176 A | 11/2020 |
| EP | 2942847 B1 | 7/2019 |
| JP | 6355540 B2 | 7/2018 |
| JP | 6608746 B2 | 11/2019 |
| TW | 201901206 A | 1/2019 |
| TW | I738448 B | 9/2021 |
| TW | I749585 B | 12/2021 |
| TW | 202207559 A | 2/2022 |

OTHER PUBLICATIONS

Huang et al. "Accelerated ICP etching of 6H—SiC by femtosecond laser modification" Applied Surface Science 488 (May 2019) 853-864.
Kim et al. "Ultrashort pulse laser slicing of semiconductor crystal" Proceedings of the SPIE, vol. 9983, id. 99831B 6 pp. Jul. 2016.
Taiwanese Office Action issued in corresponding application 111132857, dated Jun. 5, 2023.

* cited by examiner

LASER MACHINING DEVICE AND METHOD THEREOF

CROSS-REFERENCE TO RELATED APPLICATIONS

This application claims priority under 35 U.S.C. § 119(a) on Patent Application No(s). 111132857 filed in Taiwan, R.O.C. on Aug. 31, 2022, the entire contents of which are hereby incorporated by reference.

BACKGROUND

1. Technical Field

This present disclosure relates to a laser machining device and a laser machining method.

2. Related Art

With the rapid development of electric vehicles and 5G/6G network transmission, the materials of electronic components in the related technical fields faces some bottlenecks and challenges. For example, the conventional silicon-based power devices cannot meet the requirements for electric vehicle applications, and thus the silicon materials should be replaced with compound semiconductor materials with higher blocking voltage.

The compound semiconductor materials include silicon carbide (SiC), aluminum nitride (AlN) and so on, and SiC has been widely used in recent years. Due to a high Mohs harness scale of the compound semiconductor materials, a conventional micro machining process by using diamond cutters cannot efficiently process the compound semiconductor materials and is also difficult to provide high cutting quality. In order to improve the problems faced by the conventional micro machining process, a cutting process by treating an area of the semiconductor material is considered as one of the solutions for compound semiconductor micro machining.

In general, the cutting process by treating refers to a laser bombardment on a surface of the semiconductor material to form a surface treatment layer with fragile structure. Due to the high hardness of the compound semiconductor materials, a laser micro machining process for the compound semiconductor materials should be performed by using high energy pulsed laser, and thus the properties of the compound semiconductor materials are easily deteriorated by the thermal effect caused by the high energy pulsed laser. At present, although the pulsed lasers with short pulse durations are used for micro machining to reduce the thermal effect, said short pulse durations are still within several picoseconds (ps) to one hundred or several hundred femtoseconds (fs), which cannot satisfy the micro machining processes for high-end products.

SUMMARY

According to one embodiment of the present disclosure, a laser machining device includes a pulsed laser generator, an accommodation chamber, a bandwidth broadening unit and a pulse compression unit. The pulsed laser generator is configured to emit a pulsed laser. The accommodation chamber has a gas inlet. The bandwidth broadening unit is disposed in the accommodation chamber, and is configured to broaden a frequency bandwidth of the pulsed laser to obtain a broad bandwidth pulsed laser. The pulse compression unit is disposed in the accommodation chamber. The bandwidth broadening unit and the pulse compression unit are arranged in order along a laser propagation path, and the pulse compression unit is configured to compress a pulse duration of the broad bandwidth pulsed laser.

According to another embodiment of the present disclosure, a laser machining device includes a pulsed laser generator, a bandwidth broadening unit, an inert gas medium and a pulse compression unit. The pulsed laser generator is configured to emit a pulsed laser. The bandwidth broadening unit is configured to broaden a frequency bandwidth of the pulsed laser to obtain a broad bandwidth pulsed laser. The bandwidth broadening unit is located in the inert gas medium. The bandwidth broadening unit and the pulse compression unit are arranged in order along a laser propagation path, and the pulse compression unit is configured to compress a pulse duration of the broad bandwidth pulsed laser.

According to still another embodiment of the present disclosure, a laser machining method includes: emitting a pulsed laser by a pulsed laser generator; broadening a frequency bandwidth of the pulsed laser by a bandwidth broadening unit to obtain a broad bandwidth pulsed laser; receiving the broad bandwidth pulsed laser and compressing a pulse duration of the broad bandwidth pulsed laser to be equal to or less than 50 fs by a pulse compression unit to obtain a short duration pulsed laser; and processing a compound semiconductor material by the short duration pulsed laser to form a surface treatment layer on the compound semiconductor material.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
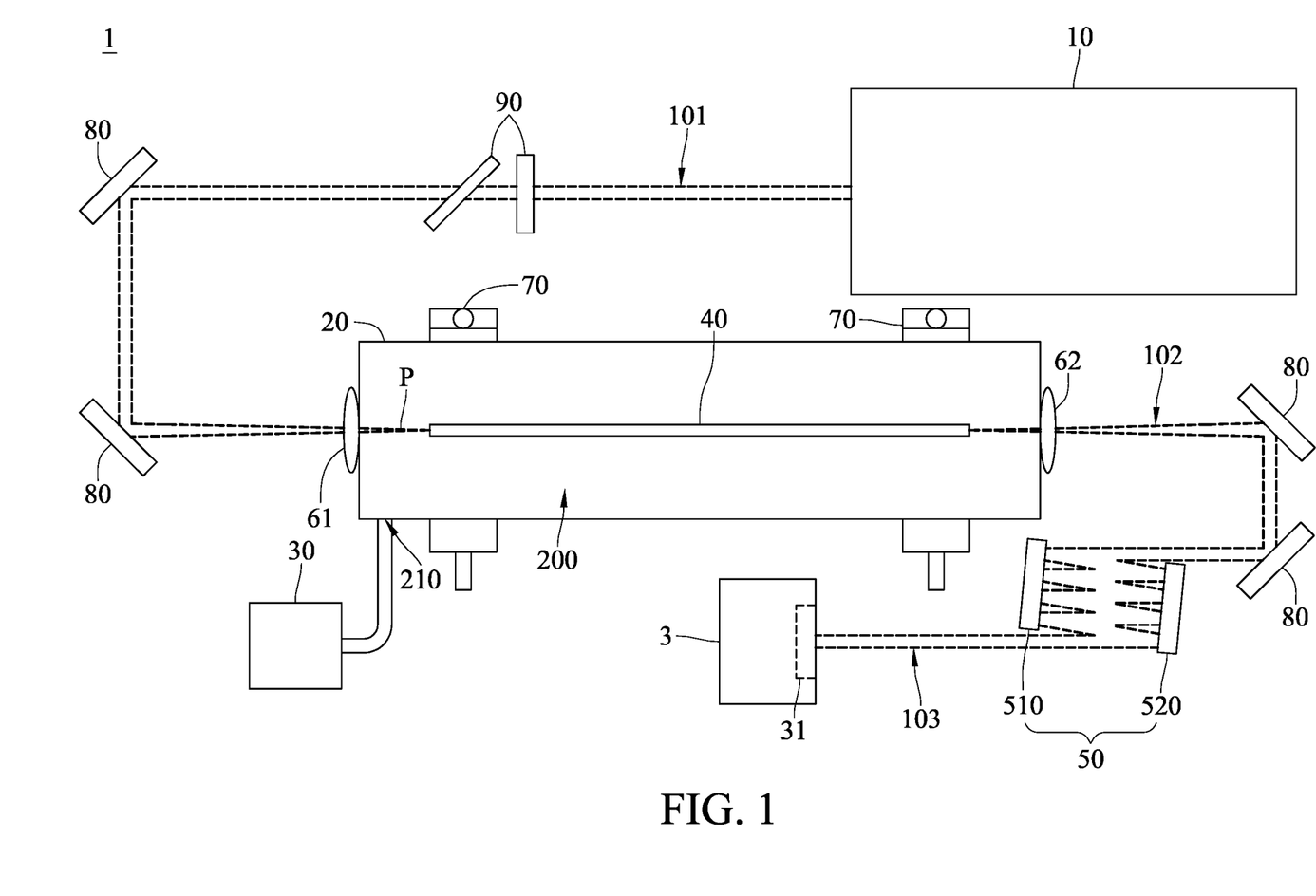
FIG. 1 is a schematic view of a laser machining device according to one embodiment of the present disclosure.

According to the present disclosure, a laser machining device may include a pulsed laser generator, an accommodation chamber, a bandwidth broadening unit and a pulse compression unit. Please refer to FIG. 1 showing a schematic view of a laser machining device according to one embodiment of the present disclosure. In this embodiment, a laser machining device 1 includes a pulsed laser generator 10, an accommodation chamber 20, inert gas source 30, a bandwidth broadening unit 40 and a pulse compression unit 50.

The pulsed laser generator 10, for example but not limited to, is a mode-locked pulsed laser generator configured to emit a pulsed laser 101. The pulsed laser 101 generated by the pulsed laser generator 10 may have a pulse duration less than 500 fs, preferably a pulse duration of one hundred or several hundred femtoseconds, such as 350 fs to 500 fs.

The accommodation chamber 20, for example but not limited to, is a tubular chamber, and the accommodation chamber 20 has a gas inlet 210. The inert gas source 30 is connected with the space 200 inside the accommodation chamber 20 through the gas inlet 210. The inert gas source 30 can supply one or more kinds of inert gases, such as argon gas or neon gas, into accommodation chamber 20.

Figure 2:
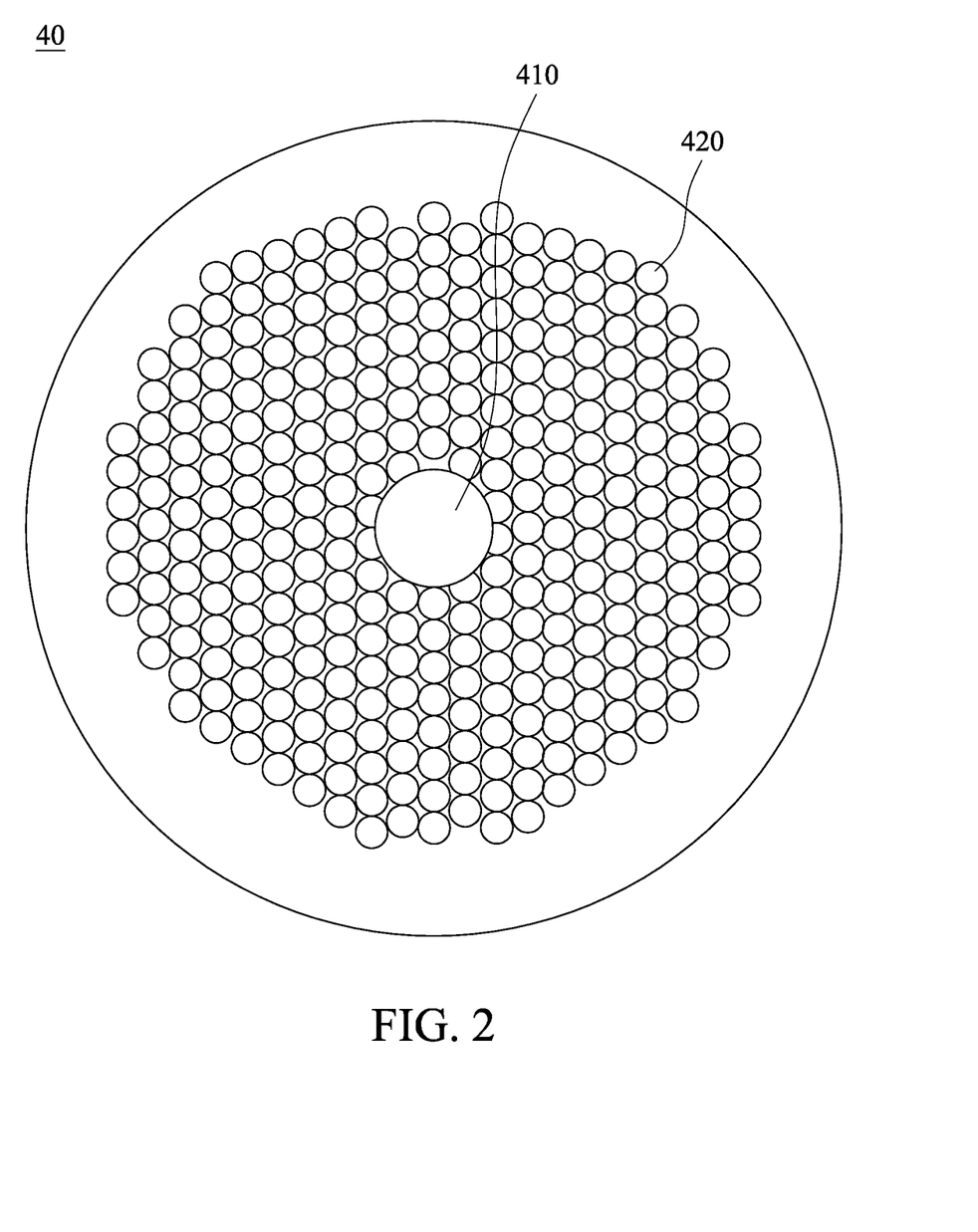
FIG. 2 is a cross-sectional view of a bandwidth broadening unit of the laser machining device in FIG. 1.

The bandwidth broadening unit 40 and the pulse compression unit 50 are arranged in order along a laser propagation path P. The bandwidth broadening unit 40, for example but not limited to, includes a hollow core photonic crystal fiber (HC-PCF) disposed in the accommodation chamber 200. FIG. 2 is a cross-sectional view of a bandwidth broadening unit of the laser machining device in FIG. 1. The HC-PCF of the bandwidth broadening unit 40 includes a central through hole 410 and a periodic structure 420 around the central through hole 410. The periodic structure 420 includes an array of with holes, and each hole in this array has a smaller diameter than the central through hole 410. The frequency bandwidth of the pulsed laser 101 is broadened by non-linear effect generated by the bandwidth broadening unit 40 so as to obtain a pulsed laser 102 with broader frequency bandwidth (broad bandwidth pulsed laser). Specifically, the frequency bandwidth of the pulsed laser 101 is broadened by non-linear effect in the HC-PCF, and factors that affect the effect of bandwidth broadening may include refractive indices of the medium in the central through hole 410 and the periodic structure 420, a refractive index of the material of the HC-PCF, and a length of the HC-PCF.

The pulse compression unit 50, for example but not limited to, includes a chirped mirror assembly disposed outside the accommodation chamber 20, and the chirped mirror assembly is configured to compress the pulse duration of the pulsed laser 102. In detail, the chirped mirror assembly may include two chirped mirrors 510 and 520 which are substantially disposed to be parallel to each other. The spatial distribution of the chirped mirrors 510 and 520 can compress the broad bandwidth pulsed laser 102 so as to obtain a pulsed laser 103 with shorter pulse duration (short duration pulsed laser). The short duration pulsed laser 103 can be used for the micro machining of compound semiconductor material, e.g., cutting of the compound semiconductor material 3 by pulsed laser.

In this embodiment, the laser machining device 1 may further include a focusing lens 61 and a collimating lens 62. The bandwidth broadening unit 40 is located between the focusing lens 61 and the collimating lens 62. An optical axis of the pulsed laser 101 is coaxial with a fiber axis of the HC-PCF, and the focusing lens 61 and the collimating lens 62 are disposed at opposite ends of the accommodation chamber 20, respectively, to constitute a confocal configuration, such that the pulsed laser 101 is focused and optically coupled into the bandwidth broadening unit 40 by the focusing lens 61. The frequency bandwidth of the pulsed laser is broadened by the interference between the reflected light and the incident light due to the propagation of light among the optical fiber material, the central perforation 410, and the periodic structure 420. The broad bandwidth pulsed laser 102 propagating from the bandwidth broadening unit 40 is adjusted by the collimating lens 62 to be a collimated laser beam with parallel rays.

Moreover, the laser machining device 1 may further include a movable carrier 70, and the accommodation chamber 20 is mounted on the movable carrier 70. The movable carrier 70 is movable with respect to the bandwidth broadening unit 40 so as to adjust the position of the accommodation chamber 20 to thereby make the pulsed laser generator 10 coaxial with the bandwidth broadening unit 40.

Depending on actual design requirements, the laser machining device 1 may further include additional optical elements configured to fold the laser propagation path (traveling direction of laser) or adjust the beam size of the pulsed laser. For example, the laser machining device 1 may include one or more reflectors 80 and a beam shaper 90, but the present disclosure is not limited thereto. The reflector 80 is provided to change the travelling directions of the pulsed laser 101 and/or the broad bandwidth pulsed laser 102, and the beam shaper 90 is provided to shape the pulsed laser 101, such that the energy distribution of the short duration pulsed laser 103 is suitable for laser micromachining.

Figure 3:
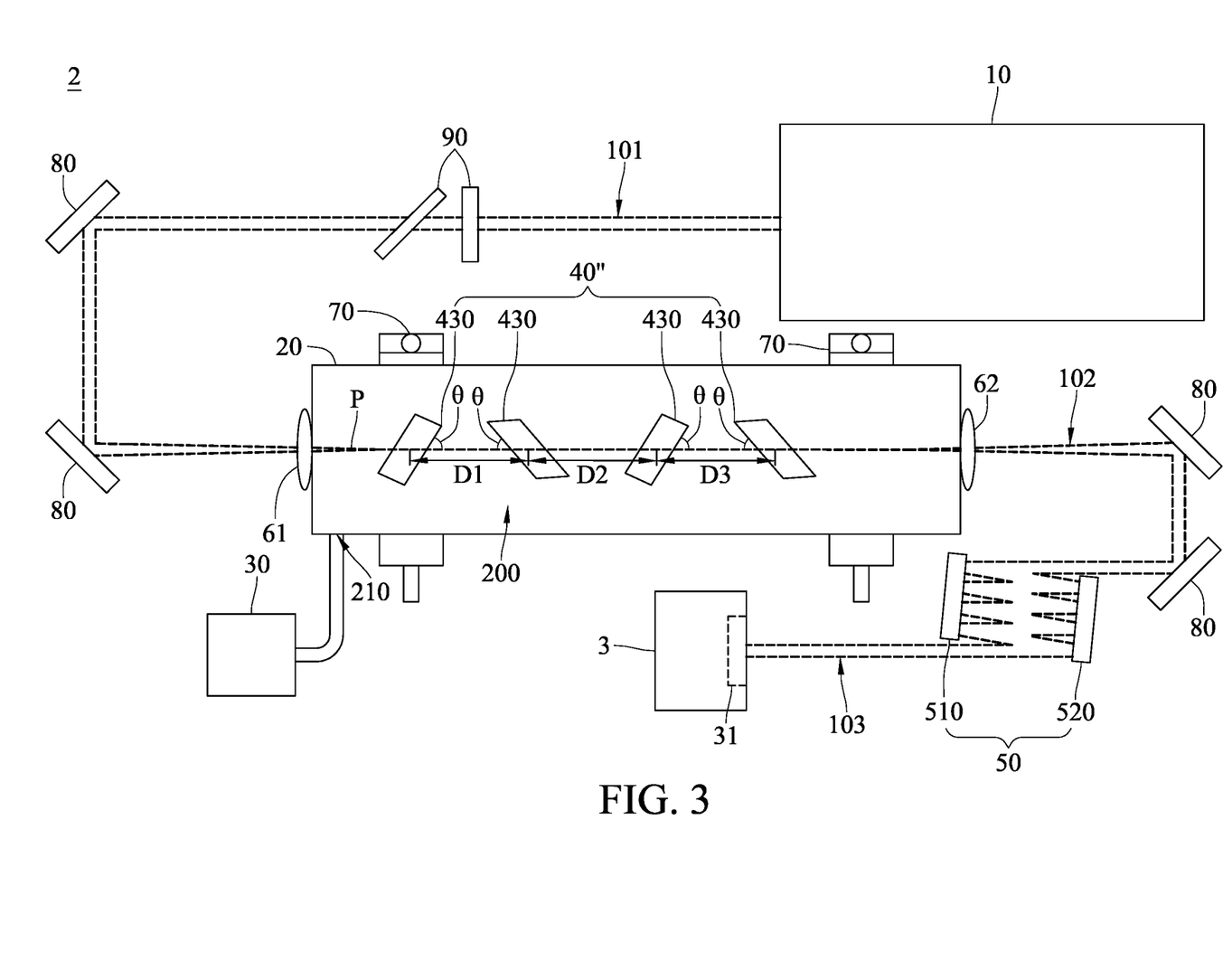
FIG. 3 is a schematic view of a laser machining device according to another embodiment of the present disclosure.

The bandwidth broadening unit 40 includes HC-PCF in FIG. 1, while the bandwidth broadening unit may include one or more thin plates in some other embodiments. FIG. 3 is a schematic view of a laser machining device according to another embodiment of the present disclosure. In this embodiment, a laser machining device 2 includes a bandwidth broadening unit 40". The details of the pulsed laser generator 10, the accommodation chamber 20, the inert gas source 30 and the pulse compression unit 50 in FIG. 3 can be referred to the like of them disclosed above. The following is a detailed description of the bandwidth broadening unit 40".

The bandwidth broadening unit 40" may include a plurality of thin plates 430 arranged in order along the laser propagation path P. The thin plates 430 are disposed in the space 200 of the accommodation chamber 20, and each thin plate 430 made of made of BK7 glass, quartz glass or sapphire. The frequency bandwidth of the pulsed laser 101 is broadened by non-linear effect among the thin plates 430 to obtain the broad bandwidth pulsed laser 102.

The spacing between adjacent thin plates 430 may be set from large to small, for example, in FIG. 3, the spacing D1 is larger than the spacing D2, and the spacing D2 is larger than the spacing D3. As the thin plates 430 repeatedly generates non-linear effect thus broadening the frequency bandwidth of the pulsed laser 101. Since the pulsed laser 101 will be gradually divergent as the number of the thin plates 430 increases, the number of the thin plates 430, the spacing between adjacent thin plates 430, and the thickness of each thin plate 430 can be altered according to the actual requirement.

The thickness of the thin plate 430 may be related to self-focusing occurring due to a cross-sectional distribution of the intensity gradient of the pulsed laser. The pulsed laser focuses when propagating through the thin plates 430, and the pulsed laser slightly defocuses when propagating through the gas medium, and the cycle of self-focusing and defocusing repeats according to the number of the thin plates 430. Accordingly, the thickness of the thin plate 430 may be related to the intensity distribution of the pulsed laser and the properties of the thin plate 430.

Furthermore, the angle θ between a light receiving surface of each thin plate 430 and the laser propagation path P may be a Brewster's angle satisfying the following a condition of $$\theta = \arctan \frac{n_2}{n_1},$$

wherein n1 represents the refractive index of an incident medium, and n2 represents the refractive index of a refracted medium. The Brewster's angle is helpful to prevent reflection of the pulsed laser by the thin plates 430, such that the pulsed laser can retain more energy after passing through the thin plates 430.

Figure 4:
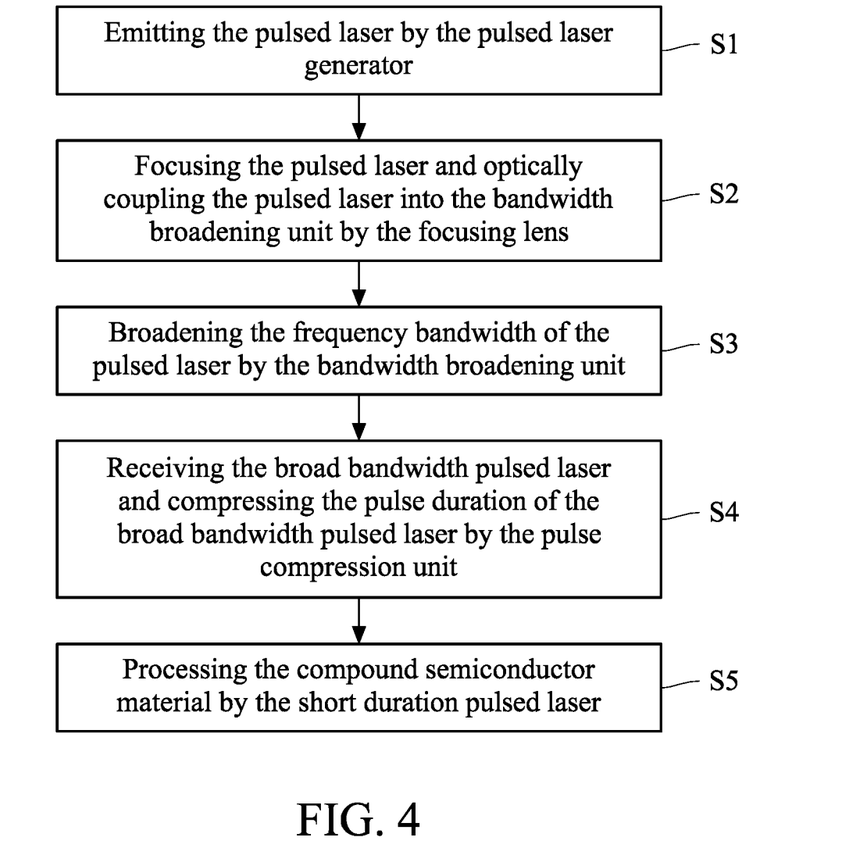
FIG. 4 is a flow chart of a laser machining method according to one embodiment of the present disclosure.

FIG. 4 is a flow chart of a laser machining method according to one embodiment of the present disclosure. In this embodiment, a laser machining method exemplarily performed by the laser machining device 1 in FIG. 1 is disclosed, and the laser machining method includes steps S1 to S5.

In the step S1, the pulsed laser 101 is emitted by the pulsed laser generator 10, and the characteristics of the pulsed laser 101, for example but not limited to, are as follows:

Wavelength: 1030 nm;
Pulse duration: less than 500 fs, wherein said pulse duration may be defined as a full width at half maximum (FWHM) of the pulsed laser in time domain;
Spectral width: ±10 nm;
Single pulse energy: less than 0.4 millijoule (mJ);
Average power: less than 40 W; and
Pulse repetition frequency: less than 1 megahertz (MHz).

In the step S2, the pulsed laser 101 is focused and optically coupled into the bandwidth broadening unit 40 by the focusing lens 6. In detail, the beam shaper 90 can adjust the pulsed laser 101 to be a laser beam with parallel rays. The laser beam propagates through the focusing lens 61 and then into the bandwidth broadening unit 40 along the laser propagation path P.

In the step S3, the frequency bandwidth of the pulsed laser 101 is broadened by the bandwidth broadening unit 40. In detail, the inert gas source 30 can supply argon (Ar) atmosphere or neon (Ne) atmosphere to the accommodation chamber 20, such that the bandwidth broadening unit 40 is located in the inert gas medium. The bandwidth broadening of the pulsed laser 101 is accomplished by the non-linear effect due to the refractive index difference between the inert gas medium and the HC-PCF so as to obtain a broad bandwidth pulsed laser 102.

In the step S4, the broad bandwidth pulsed laser 102 is received by the pulse compression unit 50, and the pulse duration of the broad bandwidth pulsed laser 102 is compressed by the pulse compression unit 50. In detail, the spatial distribution of the chirped mirrors 510 and 520 can compress the broad bandwidth pulsed laser 102 so as to obtain the short duration pulsed laser 103. The characteristics of the short duration pulsed laser 103, for example but not limited to, are as follows:

Wavelength: 1030 nm;
Pulse duration: equal to or less than 50 fs, preferably less than 30 fs;
Spectral width: ±10 nm;
Single pulse energy: less than 0.2 mJ;
Average power: less than 20 W;
Pulse repetition frequency: less than 300 kHz.

In the step S5, the compound semiconductor material 3 is processed by the short duration pulsed laser 103 so as to form a surface treatment layer 31. As shown in FIG. 1, the short duration pulsed laser 103 bombards a processed area 31 of the compound semiconductor material 3 along a predetermined processing route to form the surface treatment layer 31 on this area. The compound semiconductor material 3, for example but not limited to, is a SiC wafer.

Figure 5:
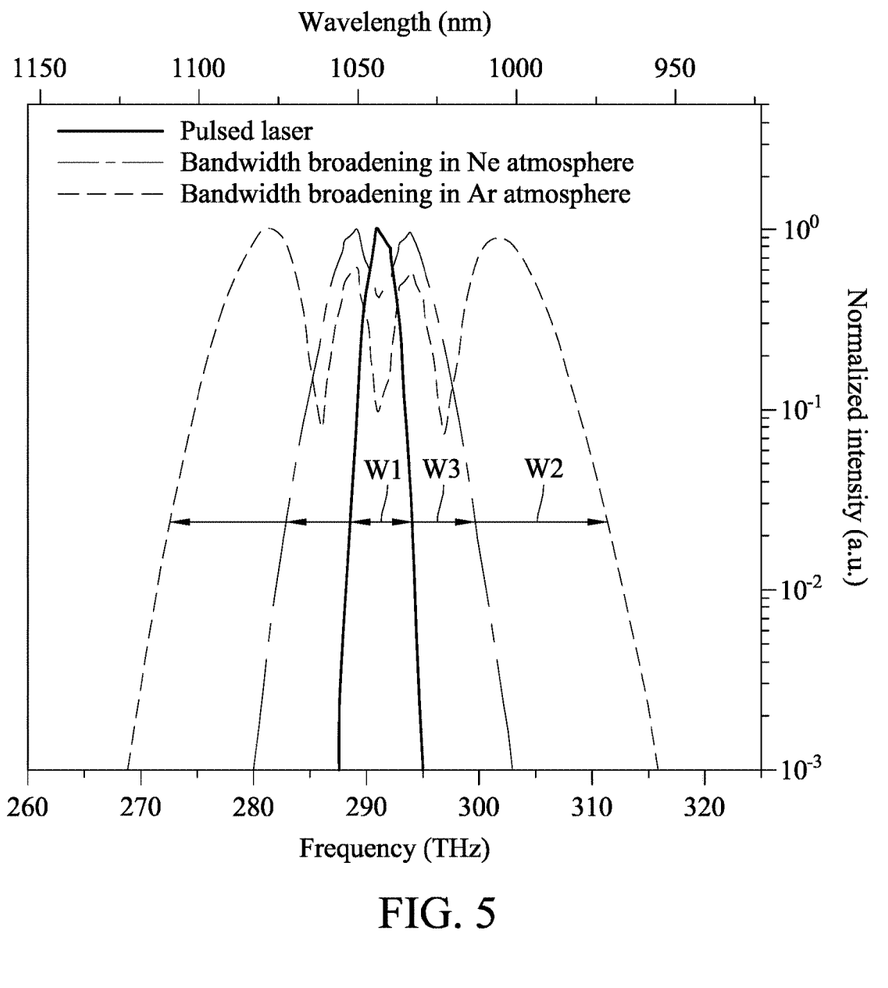
FIG. 5 is a graph representing effects of bandwidth broadening of the pulsed lasers in different gas mediums.
Figure 6:
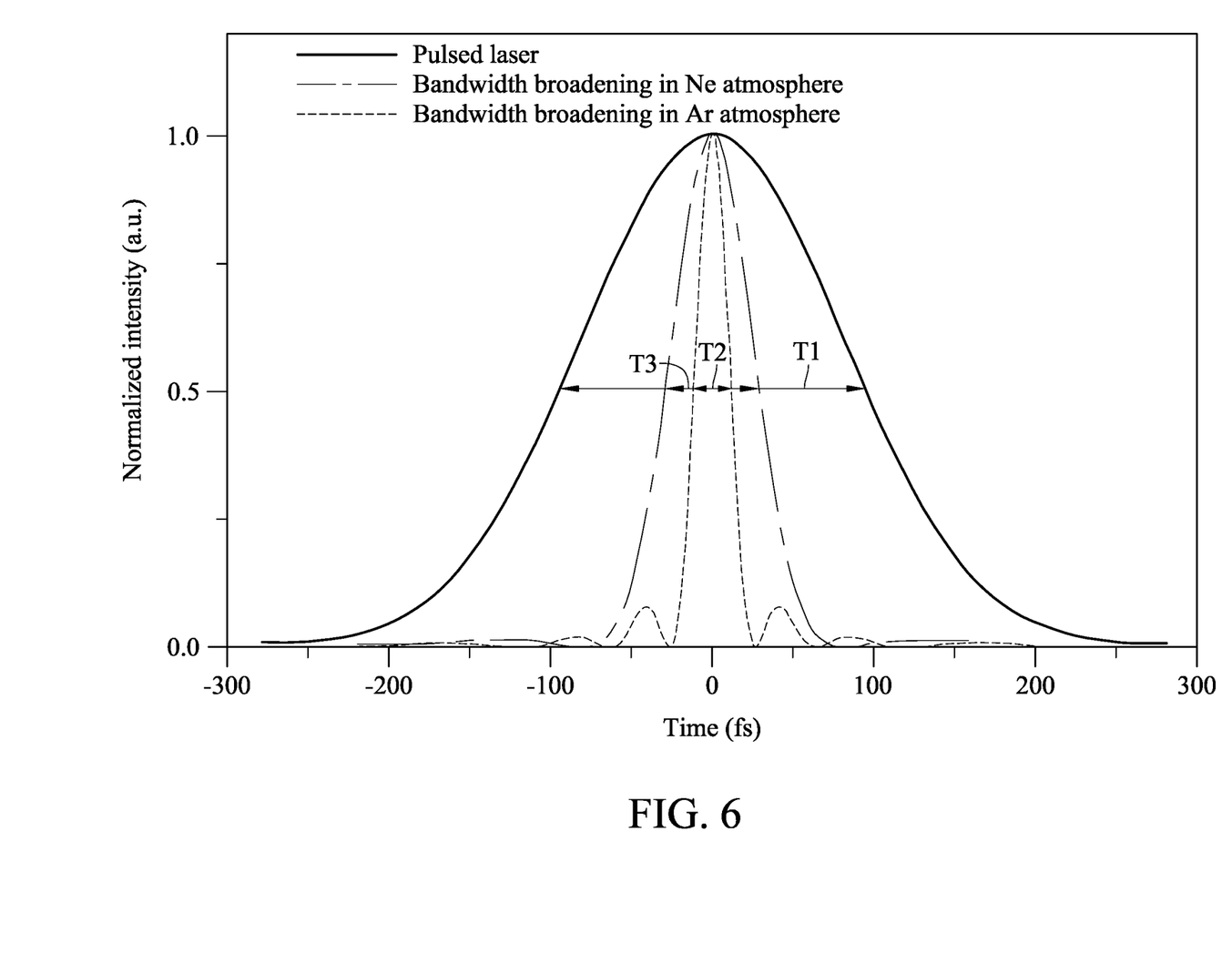
FIG. 6 is a graph representing effects of pulse compression of the pulsed lasers with different frequency bandwidths in FIG. 5.

The inert gas supplied into the accommodation chamber 20 may affect the effects of bandwidth broadening and pulse compression. Please refer to FIG. 5 and FIG. 6. FIG. 5 is a graph representing effects of bandwidth broadening of the pulsed lasers in different gas mediums, and FIG. 6 is a graph representing effects of pulse compression of the pulsed lasers with different frequency bandwidths in FIG. 5.

In FIG. 5, the frequency bandwidth W1 of the pulsed laser 101 may be approximately 7 THz. Referring to the results of bandwidth broadening by the bandwidth broadening unit 40 of FIG. 1 in Ar atmosphere and Ne atmosphere, it is found that the broad bandwidth pulsed laser 102 enjoys larger frequency bandwidth W2 (approximately 45 THz) when the bandwidth broadening unit 40 is in Ar atmosphere, and the broad bandwidth pulsed laser 102 has a frequency bandwidth W3 (approximately 23 THz) larger than W1 but smaller than W2 when the bandwidth broadening unit 40 is in Ne atmosphere. Thus, the bandwidth broadening unit 40 located in the inert gas medium mainly including Ar atmosphere shows greatly improved bandwidth broadening effect.

The effect of pulse compression is positively correlated with the frequency bandwidth of the broad bandwidth pulsed laser 102. In FIG. 6, the pulse duration T1 of the pulsed laser 101 may be approximately 350 fs. As to the short duration pulsed laser 103 obtained by pulse compression of the broad bandwidth pulsed laser 102 with greatly large frequency bandwidth (for example, the pulsed laser 102 obtained by bandwidth broadening in Ar atmosphere), the pulse duration T2 of the pulsed laser 103 may be equal to or less than 50 fs. In contrast, as to the short duration pulsed laser 103 obtained by pulse compression of the broad bandwidth pulsed laser 102 with slightly large frequency bandwidth (for example, the pulsed laser 102 obtained by bandwidth broadening in Ne atmosphere), the pulse duration T3 of the pulsed laser 103 may be within the range of 100 fs to 150 fs.

Figure 7:
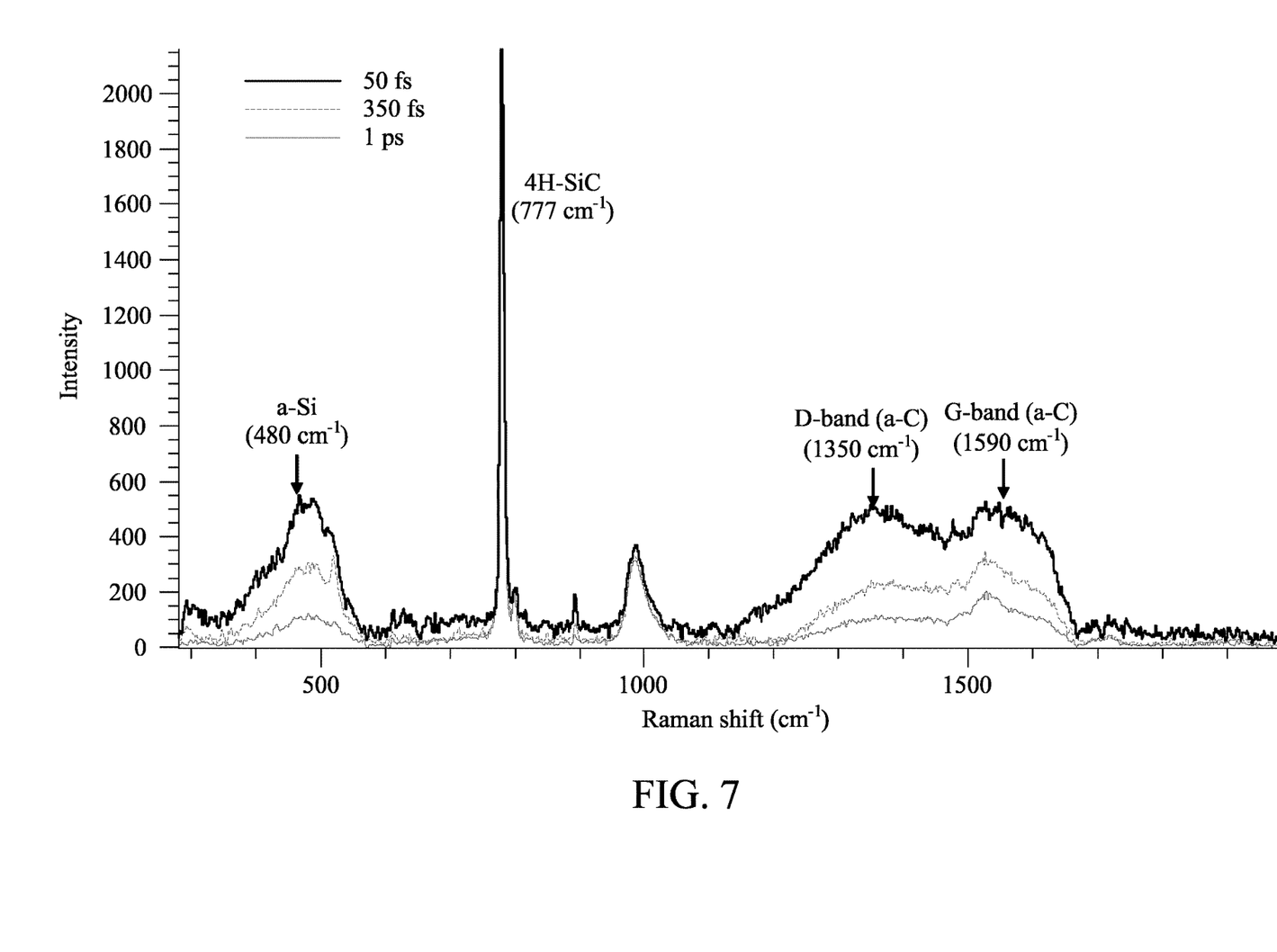
FIG. 7 is a Raman spectra graph representing surface treatment quality on a compound semiconductor material performed by the pulsed lasers with different pulse durations.

The laser machining for the compound semiconductor material 3 by using the short duration pulsed laser 103 with a pulse duration equal to or less than 50 fs has an advantage in improving the effect of surface treatment. FIG. 7 is a Raman spectra graph representing surface treatment quality on a compound semiconductor material performed by the pulsed lasers with different pulse durations.

The pulsed lasers with various pulse durations of 50 fs, 350 fs and 1 ps are used to processing the treated area of the compound semiconductor material, and the Raman spectra of the regions around the treated area is obtained by Raman spectroscopy after the laser machining. In FIG. 7, the compound semiconductor material processed by the pulsed laser with the pulse duration of 50 fs features highly intense D-band (1350 cm$^{-1}$) and G-band (1590 cm$^{-1}$), which represents that the pulsed laser breaks the bonds of silicon carbide in the treated area into a large number of amorphous carbon bonds, resulting in a high quality surface treatment layer with significantly reduced hardness.

According to the present disclosure, a bandwidth broadening unit is configured to broaden a frequency bandwidth of the pulsed laser to obtain a broad bandwidth pulsed laser, and a pulse compression unit is configured to compress a pulse duration of the broad bandwidth pulsed laser. The bandwidth broadening unit can be disposed in an accommodation chamber filled with inert gas for improving bandwidth broadening effect, such that the broad bandwidth pulsed laser enjoys large frequency bandwidth, and thus the pulse duration of the broad bandwidth pulsed laser can be compressed to be equal to or less than 50 fs. The laser machining of the compound semiconductor material by the pulsed laser with extremely short pulse duration can efficiently break chemical bonds (for example, to break the bonds of silicon carbide into amorphous carbon bonds) so as to obtain a high quality surface treatment layer with significantly reduced hardness. Moreover, the laser machining by the pulsed laser with extremely short pulse duration is also prevented from heat effect so as to be helpful for increasing the yield of laser machining.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A laser machining device, comprising:
    a pulsed laser generator configured to emit a pulsed laser;
    an accommodation chamber having a gas inlet;
    a bandwidth broadening unit disposed in the accommodation chamber, wherein the bandwidth broadening unit is configured to broaden a frequency bandwidth of the pulsed laser to obtain a broad bandwidth pulsed laser; and
    a pulse compression unit disposed in the accommodation chamber, wherein the bandwidth broadening unit and the pulse compression unit are arranged in order along a laser propagation path, and the pulse compression unit is configured to compress a pulse duration of the broad bandwidth pulsed laser;
    wherein the bandwidth broadening unit comprises a hollow core photonic crystal fiber (HC-PCF) disposed in an accommodation chamber, the frequency bandwidth of the pulsed laser is broadened by non-linear effect in the HC-PCF, the HC-PCF comprises a central through hole and a periodic structure around the central through hole, an optical axis of the pulsed laser is coaxial with a fiber axis of the HC- PCF, the pulsed laser is focused and propagates into the central through hole.

2. The laser machining device according to claim 1, further comprising an inert gas source, wherein the inert gas source is connected with the accommodation chamber through the gas inlet, and the inert gas source is configured to provide an inert gas atmosphere to the bandwidth broadening unit.

3. The laser machining device according to claim 2, wherein the inert gas source comprises argon.

4. The laser machining device according to claim 1, wherein the bandwidth broadening unit comprises a plurality of thin plates disposed in the accommodation chamber, and the frequency bandwidth of the pulsed laser is broadened by non-linear effect among the plurality of thin plates.

5. The laser machining device according to claim 1, wherein the pulsed laser generator is a mode-locked pulsed laser generator, and the pulsed laser generated by the mode-locked pulsed laser generator has a pulse duration of 350 femtoseconds (fs) to 500 fs.

6. The laser machining device according to claim 1, wherein the pulse compression unit comprises a chirped mirror assembly, and the pulse duration of the broad bandwidth pulsed laser is compressed by the chirped mirror assembly.

7. The laser machining device according to claim 1, further comprising a focusing lens and a collimating lens, wherein the focusing lens and the collimating lens are disposed at opposite ends of the accommodation chamber, respectively, to constitute a confocal configuration.

8. A laser machining device, comprising:
    a pulsed laser generator configured to emit a pulsed laser;
    a bandwidth broadening unit configured to broaden a frequency bandwidth of the pulsed laser to obtain a broad bandwidth pulsed laser;
    an inert gas medium, wherein the bandwidth broadening unit is located in the inert gas medium; and
    a pulse compression unit, wherein the bandwidth broadening unit and the pulse compression unit are arranged in order along a laser propagation path, and the pulse compression unit is configured to compress a pulse duration of the broad bandwidth pulsed laser;
    wherein the bandwidth broadening unit comprises a hollow core photonic crystal fiber (HC-PCF) disposed in an accommodation chamber, the frequency bandwidth of the pulsed laser is broadened by non-linear effect in the HC-PCF, the HC-PCF comprises a central through hole and a periodic structure around the central through hole, an optical axis of the pulsed laser is coaxial with a fiber axis of the HC- PCF, the pulsed laser is focused and propagates into the central through hole.

9. The laser machining device according to claim 8, wherein the inert gas medium comprises argon atmosphere.

10. The laser machining device according to claim 8, wherein the pulsed laser generator is a mode-locked pulsed laser generator, and the pulsed laser generated by the mode-locked pulsed laser generator has a pulse duration of 350 fs to 500 fs.

11. The laser machining device according to claim 8, further comprising a focusing lens and a collimating lens, wherein the focusing lens and the collimating lens are disposed at opposite ends of the bandwidth broadening unit, respectively, to constitute a confocal configuration.

12. A laser machining method, comprising:
    emitting a pulsed laser by a pulsed laser generator;
    broadening a frequency bandwidth of the pulsed laser by a bandwidth broadening unit to obtain a broad bandwidth pulsed laser;
    receiving the broad bandwidth pulsed laser and compressing a pulse duration of the broad bandwidth pulsed laser to be equal to or less than 50 fs by a pulse compression unit to obtain a short duration pulsed laser; and
    processing a compound semiconductor material by the short duration pulsed laser to form a surface treatment layer on the compound Semiconductor material;
    wherein the bandwidth broadening unit comprises a hollow core photonic crystal fiber (HC-PCF) disposed in an accommodation chamber, the frequency bandwidth of the pulsed laser is broadened by non-linear effect in the HC-PCF, the HC-PCF comprises a central through hole and a periodic structure around the central through hole, an optical axis of the pulsed laser is coaxial with a fiber axis of the HC- PCF, the pulsed laser is focused and propagates into the central through hole.

* * * * *